(12) United States Patent
Ryu

(10) Patent No.: US 12,734,782 B2
(45) Date of Patent: Sep. 15, 2026

(54) SHEET-TYPE FIBER-REINFORCED COMPOSITE HAVING HETEROGENEOUS PROPERTIES AND METHOD FOR MANUFACTURING THE SAME

(71) Applicant: KOLON SPACEWORKS CO. ,LTD., Haman-gun (KR)

(72) Inventor: Seokgn Ryu, Gimcheon (KR)

(73) Assignee: KOLON SPACEWORKS CO., LTD., Haman-gun (KR)

( * ) Notice: Subject to any disclaimer, the term of this patent is extended or adjusted under 35 U.S.C. 154(b) by 313 days.

(21) Appl. No.: 18/533,375

(22) Filed: Dec. 8, 2023

(65) Prior Publication Data

US 2024/0190103 A1 Jun. 13, 2024

(30) Foreign Application Priority Data

Dec. 13, 2022 (KR) ........................ 10-2022-0173952

(51) Int. Cl.
*B32B 5/12* (2006.01)
*B29B 11/16* (2006.01)
(Continued)

(52) U.S. Cl.
CPC ................ *B32B 5/12* (2013.01); *B29B 11/16* (2013.01); *B29C 70/228* (2013.01); *B32B 5/024* (2013.01); *B32B 5/263* (2021.05); *B32B 2250/03* (2013.01)

(58) Field of Classification Search
CPC .. B32B 7/03; B32B 5/12; B32B 5/263; B32B 5/024; B32B 5/26; B32B 3/12; B32B 27/08; B32B 27/32; B32B 27/365; B32B 37/04; B32B 2037/009; B32B 2038/045; B32B 2250/03; B32B 2262/0263; B32B 2262/0276; B32B 2262/101; B32B 2262/106; B32B 2305/076; B29C 70/0035; B29C 70/22; B29C 70/228; B29C 70/52; B29C 70/645; B29C 2793/0036; B29C 2793/009; B29B 11/16; B29K 2101/12; B29K 2995/0016
(Continued)

(56) References Cited

U.S. PATENT DOCUMENTS

2017/0129145 A1* 5/2017 Wang .................... B29C 44/128
2021/0276280 A1 9/2021 Sauer

FOREIGN PATENT DOCUMENTS

DE 102019118587 B3 7/2020
KR 10-2019-0031908 A 3/2019

OTHER PUBLICATIONS

The extended European Search Report dated May 8, 2024.

* cited by examiner

*Primary Examiner* — Camie S Thompson
(74) *Attorney, Agent, or Firm* — Harvest IP Law, LLP

(57) ABSTRACT

The present invention provides a fiber-reinforced composite material including a first fiber-reinforced sheet in which first prepregs including reinforcing fibers arranged in one direction and a first thermoplastic resin are woven to cross each other, a second fiber-reinforced sheet in which the first prepreg, and a second prepreg including reinforcing fibers arranged in one direction and a second thermoplastic resin are woven to cross each other, and a third fiber-reinforced sheet in which the second prepregs are woven to cross each other, wherein the second fiber-reinforced sheet is disposed between the first fiber-reinforced sheet and the third fiber-reinforced sheet.

16 Claims, 3 Drawing Sheets

(51) Int. Cl.

| | |
|---|---|
| ***B29C 70/22*** | (2006.01) |
| ***B32B 5/02*** | (2006.01) |
| ***B32B 5/26*** | (2006.01) |

(58) Field of Classification Search

USPC ........................................ 428/292.1; 442/169

See application file for complete search history.

SHEET-TYPE FIBER-REINFORCED COMPOSITE HAVING HETEROGENEOUS PROPERTIES AND METHOD FOR MANUFACTURING THE SAME

CROSS-REFERENCE TO RELATED APPLICATION

This application claims priority to and the benefit of Korean Patent Application No. 10-2022-0173952 filed in the Korean Intellectual Property Office on Dec. 13, 2022, the entire contents of which are incorporated herein by reference.

BACKGROUND OF THE INVENTION

(a) Field of the Invention

The present disclosure relates to a sheet-type fiber-reinforced composite material and a method of manufacturing the same. More specifically, it relates to a fiber-reinforced composite material that has heterogeneous properties of adhesion and flame resistance and can be applied to parts requiring high strength, and a method of manufacturing the same.

(b) Description of the Related Art

Recently, as the demand for electric vehicles increases, there is an emerging issue of reducing a weight of the vehicles. Accordingly, a polypropylene resin reinforced with continuous glass fibers has excellent strength, specific gravity, etc. and is used in automobile mechanical parts as an alternative material for a metal and a sheet molding compound (SMC).

In particular, the polypropylene resin reinforced with continuous glass fibers, in order to be applied as an undercover part of batteries for the electric vehicles, should have excellent flame resistance and in addition, is required of adhesion performance with an aluminum cooling plate located at the bottom of the batteries.

However, higher adhesion than that of the conventional sheet molding compound (SMC) with aluminum cannot be secured by simple polypropylene.

SUMMARY OF THE INVENTION

One aspect of the embodiment provides a fiber-reinforced composite material that has different properties on the upper and lower surfaces of a single sheet, thereby simultaneously having excellent outer flame resistance and inner adhesion to aluminum.

Another aspect of the embodiment provides a method of manufacturing a fiber-reinforced composite material that can be manufactured in the form of a single sheet by bonding different materials without a separate adhesive.

According to an example embodiment, a fiber-reinforced composite material includes a first fiber-reinforced sheet in which first prepregs including reinforcing fibers arranged in one direction and a first thermoplastic resin are woven to cross each other; a second fiber-reinforced sheet in which the first prepreg, and a second prepreg including reinforcing fibers arranged in one direction and a second thermoplastic resin are woven to cross each other; and a third fiber-reinforced sheet in which the second prepregs are woven to cross each other, wherein the second fiber-reinforced sheet is disposed between the first fiber-reinforced sheet and the third fiber-reinforced sheet.

The first prepreg and the second prepreg may be in tape form that is thin, has a width longer than the thickness, and has a length longer than the width.

The reinforcing fibers of the first prepreg may be arranged in the longitudinal direction of the first prepreg.

The reinforcing fibers of the second prepreg may be arranged in a longitudinal direction of the second prepreg.

The first fiber-reinforced sheet, the second fiber-reinforced sheet, and the third fiber-reinforced sheet may each be woven in a plain weave.

In the second fiber-reinforced sheet, an angle formed by the first prepreg and the second prepreg may be vertical.

The second fiber-reinforced sheet may include the first prepreg and the second prepreg at a weight ratio of about 1:1 to about 0.9:2.

The first thermoplastic resin of the first prepreg and the second thermoplastic resin of the second prepreg may be different thermoplastic resins.

The first thermoplastic resin of the first prepreg may include a polypropylene resin.

The second thermoplastic resin of the second prepreg may include a polycarbonate resin.

The reinforcing fibers may be continuous reinforcing fibers.

The reinforcing fibers may include glass fibers, carbon fibers, basalt fibers, metallic fibers, aramid fibers, polypropylene fibers, polyethylene terephthalate fibers, polybutylene terephthalate fibers, polyethylene fibers, natural fibers, or a combination thereof.

The first fiber-reinforced sheet, the second fiber-reinforced sheet, and the third fiber-reinforced sheet may be bonded by melting and pressing the first thermoplastic resin and the second thermoplastic resin.

The fiber-reinforced composite may not include an adhesive between the first fiber-reinforced sheet and the second fiber-reinforced sheet, or between the second fiber-reinforced sheet and the third fiber-reinforced sheet.

According to another example embodiment, a method of manufacturing a fiber-reinforced composite material includes manufacturing first prepregs including reinforcing fibers arranged in one direction and a first thermoplastic resin; manufacturing second prepregs including reinforcing fibers arranged in one direction and a second thermoplastic resin; weaving the first prepregs to cross each other to manufacture a first fiber-reinforced sheet; weaving the first prepreg and the second prepreg to cross each other to manufacture a second fiber-reinforced sheet; weaving the second prepregs to cross each other to manufacture a third fiber-reinforced sheet, and laminating the second fiber-reinforced sheet between the first fiber-reinforced sheet and the third fiber-reinforced sheet.

In the method of manufacturing a fiber-reinforced composite material, a prepreg sheet including reinforcing fibers arranged in one direction and a thermoplastic resin is manufactured using a pultrusion method, and the prepreg sheet is subjected to slitting along an arrangement direction of the reinforcing fibers to manufacture the first prepreg and the second prepreg having a tape form.

The first fiber-reinforced sheet, the second fiber-reinforced sheet, and the third fiber-reinforced sheet may be manufactured in a plain weave.

In the method of manufacturing a fiber-reinforced composite material, the second fiber-reinforced sheet may be laminated between the first fiber-reinforced sheet and the third fiber-reinforced sheet, and then melted and pressed.

The fiber-reinforced composite according to one aspect of the embodiment has excellent mechanical properties, flame resistance, and adhesion, and has resistance to externally generated flame on the outside and excellent adhesion to aluminum on the inside.

The method of manufacturing a fiber-reinforced composite material according to another aspect of the embodiment can be manufactured in the form of a single sheet by bonding heterogeneous materials without a separate adhesive.

DETAILED DESCRIPTION OF THE EMBODIMENTS

Advantages and characteristics of this disclosure, and a method for achieving the same, will become evident referring to the following exemplary embodiments. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined.

In addition, unless explicitly described to the contrary, the word "comprise", and variations such as "comprises" or "comprising", will be understood to imply the inclusion of stated elements but not the exclusion of any other elements. Further, the singular includes the plural unless mentioned otherwise.

Figure 1:
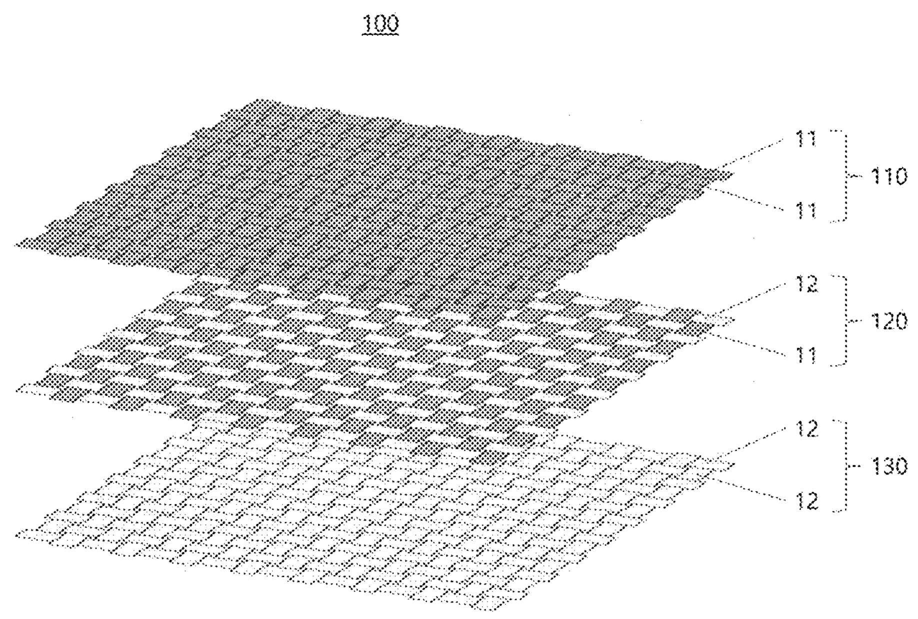
FIG. 1 is an exploded perspective view of a fiber-reinforced composite according to one embodiment.
Figure 2:
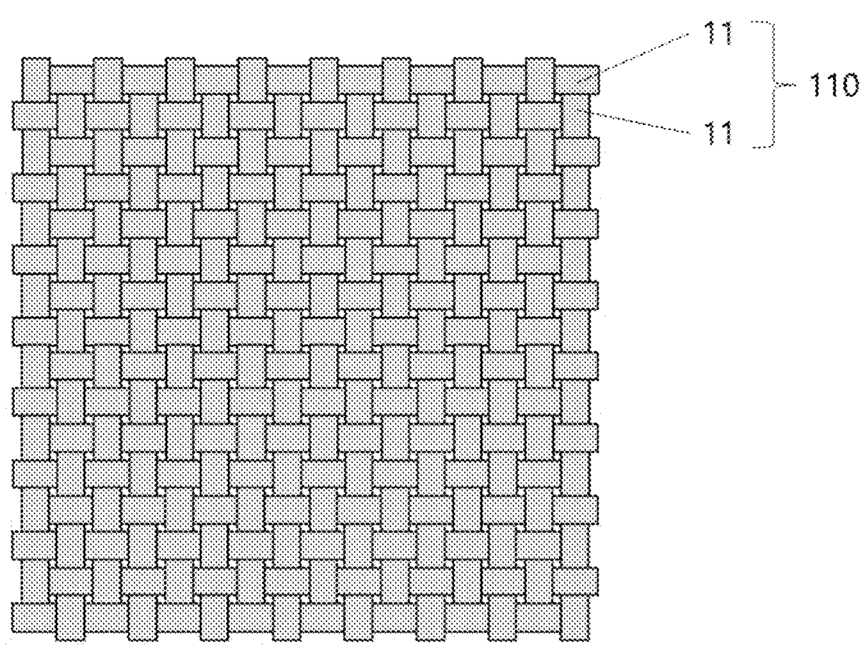
FIG. 2 is a top view of the first fiber reinforced sheet.

FIG. 1 is an exploded perspective view of a fiber-reinforced composite material 100 according to an embodiment, and FIG. 2 is a top view of the first fiber-reinforced sheet 110. Hereinafter, with reference to FIGS. 1 and 2, the fiber-reinforced composite material 100 will be described in detail.

The fiber-reinforced composite material 100 includes a first fiber-reinforced sheet 110, a second fiber-reinforced sheet 120, and a third fiber-reinforced sheet 130.

The first fiber-reinforced sheet 110 includes first prepregs 11 and may have a fabric structure in which the first prepregs 11 are woven to cross each other.

The first prepreg 11 may have a tape shape, which is thin and long with a constant width, so that it may be woven For example, the first prepreg 11 may be thin, have a width longer than the thickness, and have a length longer than the width.

For example, the first prepreg 11 may have a width of about 8 mm to about 30 mm or about 8 mm to about 20 mm. When the first prepreg 11 has too narrow a width, a plenty of curves occurs during the weaving, deteriorating properties of the fiber-reinforced sheet, but when the first prepreg 11 has too wide a width, there may be no sufficient reinforcing effect.

The first prepreg 11 may have a thickness of about 100 μm to about 1000 μm, about 100 μm to about 500 μm, or about 100 μm to about 300 μm. The width of the first prepreg 11 satisfies the above-mentioned range and at the same time satisfies the above-mentioned thickness range, so that the reinforcing effect of the strength and rigidity of the fiber-reinforced sheet can be easily secured.

The first prepreg 11 includes reinforcing fibers arranged in one direction and a first thermoplastic resin. For example, the reinforcing fibers may be arranged substantially parallel to a longitudinal direction of the first prepreg 11. The reinforcing fibers may be arranged side by side at regular intervals within the first prepreg11. The reinforcing fibers may be impregnated/immersed by the first thermoplastic resin.

The reinforcing fibers may be one of long-fiber reinforcing fibers, short-fiber reinforcing fibers, or continuous reinforcing fibers. In particular, when the reinforcing fibers are continuous reinforcing fibers, it is easier to control unidirectional orientation than short-fiber reinforcing fibers or long-fiber reinforcing fibers, and flexibility and impact resistance can be greatly improved.

The reinforcing fibers may include, for example, glass fibers, carbon fibers, basalt fibers, metallic fibers, aramid fibers, polypropylene fibers, polyethylene terephthalate fibers, polybutylene terephthalate fibers, polyethylene fibers, natural fibers, or a combination thereof. If the reinforcing fibers are continuous glass fibers, facility construction is easy and it can be advantageous in terms of securing price competitiveness compared to mechanical properties.

The reinforcing fibers may be aggregates made by gathering single strands of fibers. A single strand of reinforcing fibers may have a cross-sectional diameter of, for example, about 10 μm to about 200 μm, about 10 μm to about 50 μm, about 10 μm to about 30 μm, or about 10 μm to about 20 μm. By having a cross-sectional diameter in the above range, a single strand of reinforcing fiber can have excellent unidirectional orientation and can improve impregnation with thermoplastic resin during the manufacturing process.

The first thermoplastic resin may include a polypropylene (PP) resin, a polycarbonate (PC) resin, a polyethyleneterephthalate (PET) resin, a polyethylene (PE) resin, a polyamide (PA) resin, or a combination thereof. As the first prepreg 11 includes the first thermoplastic resin, the first fiber-reinforced sheet 110 can have improved shock absorption performance and can be bonded to other fiber-reinforced sheets by melting and pressing the first thermoplastic resin without using an adhesive.

As an example, the first thermoplastic resin may be a polypropylene (PP) resin. The first fiber-reinforced sheet 110 including the polypropylene (PP) resin has high strength, low specific gravity characteristics, and excellent flame resistance. Optionally, the first thermoplastic resin may further include a heat resistant agent or a flame retardant. Accordingly, the fiber-reinforced composite material 100 may be disposed or attached so that that first fiber-reinforced sheet 110 may face outward.

The first fiber-reinforced sheet 110 may include the reinforcing fibers in an amount of about 10 wt % to about 90 wt % or about 20 wt % to about 70 wt % and the first thermoplastic resin in an amount of about 10 wt % to about 90 wt % or about 30 wt % to about 80 wt %.

In the first fiber-reinforced sheet 110, a group of the first prepregs 11 as warp threads with another group of the first prepregs 11 as weft threads are alternately arranged with each other.

For example, the first fiber-reinforced sheet 110 may be plainly woven, wherein one group of the first prepregs 11 is perpendicular to another group of the first prepregs 11.

One of the first prepregs 11 and another group of the first prepregs 11 may be alternately arranged up and down each other with n intersections as a repeating unit. Herein, n may be an integer of 1 to 5, for example, an integer of 1 or 2.

For example, when n is 1, in the first fiber-reinforced sheet 110, one group of the first prepregs 11 and another of the first prepregs 11 are alternately arranged up and down with one intersection as a repeating unit.

The third fiber-reinforced sheet 130 includes second prepregs 12 and may have a fabric structure in which the second prepregs 12 are woven to cross each other.

The second prepreg 12 may have a tape shape which is thin and long and has a constant width so that it may be woven. For example, the second prepregs 12 may be thin, have a width longer than the thickness, and have a length longer than the width.

For example, the second prepregs 12 may have a width of about 8 mm to about 30 mm or about 8 mm to about 20 mm. When the second prepreg 12 has too narrow a width, lots of curves may occur during the weaving, deteriorating properties of the fiber-reinforced sheet, and when the width is too wide, there may be no sufficient reinforcing effect.

The second prepreg 12 may have a thickness of about 100 μm to about 1000 μm, about 100 μm to about 500 μm, or about 100 μm to about 300 μm. The width of the second prepreg 12 satisfies the above-mentioned range and at the same time satisfies the above-mentioned thickness range, so that the reinforcing effect of the strength and rigidity of the fiber-reinforced sheet can be easily secured.

The second prepreg 12 includes reinforcing fibers arranged in one direction and a second thermoplastic resin. For example, the reinforcing fibers may be arranged substantially parallel to a longitudinal direction of the second prepreg 12. The reinforcing fibers may be arranged side by side at regular intervals within the second prepreg 12. The reinforcing fibers may be impregnated/immersed in the second thermoplastic resin.

The reinforcing fibers may be one of long-fiber reinforcing fibers, short-fiber reinforcing fibers, or continuous reinforcing fibers. When the reinforcing fibers are continuous reinforcing fibers, it is easier to control unidirectional orientation than short-fiber reinforcing fibers or long-fiber reinforcing fibers, and flexibility and impact resistance can be greatly improved.

The reinforcing fibers may include, for example, glass fibers, carbon fibers, basalt fibers, metallic fibers, aramid fibers, polypropylene fibers, polyethylene terephthalate fibers, polybutylene terephthalate fibers, polyethylene fibers, natural fibers, or a combination thereof. If the reinforcing fibers are continuous glass fibers, facility construction is easy and it can be advantageous in terms of securing price competitiveness compared to mechanical properties.

The reinforcing fibers may be aggregates made by gathering single strands of fibers. A single strand of reinforcing fibers may have a cross-sectional diameter of, for example, about 10 μm to about 200 μm, about 10 μm to about 50 μm, about 10 μm to about 30 μm, or about 10 μm to about 20 μm. By having a cross-sectional diameter in the above range, a single strand of reinforcing fiber can have excellent unidirectional orientation and can improve impregnation with thermoplastic resin during the manufacturing process.

The second thermoplastic resin may include a polypropylene (PP) resin, a polycarbonate (PC) resin, a polyethyleneterephthalate (PET) resin, a polyethylene (PE) resin, a polyamide (PA) resin, or a combination thereof. As the second prepreg 12 includes the second thermoplastic resin, impact absorption performance of the third fiber-reinforced sheet 130 may be improved, and the third fiber-reinforced sheet 130 may be bonded with other fiber-reinforced sheets without using an adhesive by melting and pressing the second thermoplastic resin.

At this time, the second thermoplastic resin may be a different thermoplastic resin from the first thermoplastic resin. As an example, the second thermoplastic resin may be polycarbonate (PC) resin. The third fiber-reinforced sheet 130 including polycarbonate (PC) resin has excellent adhesion to the aluminum cooling plate disposed under the battery of the electric vehicle. Accordingly, the fiber-reinforced composite material 100 may be placed or attached so that the third fiber-reinforced sheet 130 faces the inside, that is, toward the adhesive surface.

In the third fiber-reinforced sheet 130, a content of the reinforcing fibers may be about 10 wt % to about 90 wt % or about 20 wt % to about 70 wt %, and a content of the second thermoplastic resin may be about 10 wt % to about 90 wt % or about 30 wt % to about 80 wt %.

In the third fiber-reinforced sheet 130, a group of the second prepregs 12 as warp threads with another group of the second prepregs 12 as weft threads are alternately arranged each other.

For example, the third fiber-reinforced sheet 130 may be plainly woven, and in the third fiber-reinforced sheet 130, one group of second prepregs 12 may be perpendicular to another group of the second prepregs 12.

One group of the second prepregs 12 and another group of the second prepregs 12 and may be alternately arranged up and down each other with n intersections as a repeating unit. Herein, n may be an integer of 1 to 5 or for example, 1 or 2.

For example, when n is 1, in the third fiber-reinforced sheet 130, one group of the second prepregs 12 and another group of the second prepregs 12 may be alternately arranged up and down each other with one intersection as a repeating unit.

The second fiber-reinforced sheet 120 includes first prepregs 11 and second prepregs 12, and may have a fabric structure in which the first prepregs 11 and second prepregs 12 are woven to cross each other.

Since the description of the first prepreg 11 and the second prepreg 12 is the same as described above, repetitive description will be omitted.

In the second fiber-reinforced sheet 120, the first prepregs 11 as warp threads with the second prepregs 12 as weft threads are alternately arranged each other. Or the first prepregs 11 become weft threads, while the second prepregs 12 become warp threads.

For example, the second fiber-reinforced sheet 120 may be plainly woven, wherein the first prepregs 11 may be perpendicular to the second prepregs 12.

The first prepregs 11 and the second prepregs 12 may be alternately arranged up and down each other with n intersections as a repeating unit. Herein, n may be an integer of 1 to 5 or for example, 1 or 2.

For example, when n is 1, in the second fiber-reinforced sheet 120, the first prepregs 11 and the second prepregs 12 may be alternately arranged up and down each other with one intersection as a repeating unit.

The second fiber-reinforced sheet 120 may include the first prepreg 11 and the second prepreg 12 in a weight ratio of about 1:1 to about 0.9:2. When the first prepreg 11 has a weight ratio of less than about 0.9, or the second prepreg 12 has a weight ratio of greater than about 2, adhesion between layers may be deteriorated, but when the first prepreg 11 has a weight ratio of greater than about 1, or when the second prepreg 12 has a weight ratio of less than about 1, the adhesion between layers also may be deteriorated.

The fiber-reinforced composite material 100 may include the first fiber-reinforced sheet 110, the second fiber-reinforced sheet 120, and the third fiber-reinforced sheet 130, wherein for example, the first fiber-reinforced sheet 110, the second fiber-reinforced sheet 120, and the third fiber-reinforced sheet 130 may be sequentially accumulated, and the second fiber-reinforced sheet 120 may be disposed between the first fiber-reinforced sheet 110 and the third fiber-reinforced sheet 130.

The first fiber-reinforced sheet 110, the second fiber-reinforced sheet 120, and the third fiber-reinforced sheet 130 include the first prepregs 11 and the second prepregs 12 respectively in the first thermoplastic resin and the second thermoplastic resin and thereby, may be bonded by melting and pressing the first thermoplastic resin and the second thermoplastic resin. Accordingly, the fiber-reinforced composite material 100 may not include an adhesive between the first fiber-reinforced sheet 110 and the second fiber-reinforced sheet 120 or between the second fiber-reinforced sheet 120 and the third fiber-reinforced sheet 130.

In addition, the second fiber-reinforced sheet 120 includes both the first prepreg 11 and the second prepreg 12, so that the first fiber-reinforced sheet 110 including the first prepreg 11 and the third fiber-reinforced sheet 130 including the second prepreg 12 all have excellent bonding properties.

A method of manufacturing a fiber-reinforced composite material according to another example embodiment includes preparing first prepregs and second prepregs, respectively, preparing a first fiber-reinforced sheet, a second fiber-reinforced sheet, and a third fiber-reinforced sheet, respectively, and laminating the second fiber-reinforced sheet between the first fiber-reinforced sheet and the third fiber-reinforced sheet to manufacture a fiber-reinforced composite material.

For example, the first prepregs and the second prepregs are respectively manufactured into each prepreg sheet including reinforcing fibers arranged in one direction and a thermoplastic resin by using a pultrusion method and then, to have a tape shape by sliting the prepreg sheets to a desired width along a direction where the reinforcing fibers are arranged. For example, the sliting may be performed by using a circular rotary knife.

For example, the first fiber-reinforced sheet may be manufactured by weaving the first prepregs to intersect each other, the second fiber-reinforced sheet may be manufactured by weaving the first prepregs and the second prepregs to intersect each other, and third fiber-reinforced sheet may be manufactured by weaving the second prepregs to intersect each other. Herein, the weaving method may be, for example, plain weaving.

The second fiber-reinforced sheet may be disposed between the first fiber-reinforced sheet and the third fiber-reinforced sheet and then, melted and pressed to prepare the fiber-reinforced composite material.

For example, the melting and pressing may be performed at about 140° C. to about 350° C. under a pressure of about 30 bars to about 1000 bars. During the melting and pressing, when the temperature is less than about 140° C., or the pressure is less than about 30 bars, adhesion between layers may be deteriorated, but when the temperature is greater than about 350° C., or the pressure is greater than about 1000 bar, mechanical strength may be deteriorated.

Hereinafter, specific examples of the invention are presented. However, the examples described below are only intended to specifically illustrate or describe the invention, and this should not limit the scope of the invention.

Preparation Example: Manufacture of Fiber-Reinforced Composite Material

Preparation Example 1

A first prepreg including a glass fiber and a polypropylene resin and a second prepreg including a glass fiber and a polycarbonate resin are manufactured in a pultrusion method and then, slitted to have a 9 mm-wide tape shape.

Preparation Example 2

A first fiber-reinforced sheet is manufactured by plainly weaving the first prepregs to cross each other.

A second fiber-reinforced sheet is manufactured by plainly weaving the first prepregs and the second prepregs to cross each other.

A third fiber-reinforced sheet is manufactured by plainly weaving the second prepregs to cross each other.

Preparation Example 3

A fiber-reinforced composite material is manufactured by stacking the second fiber-reinforced sheet between the first fiber-reinforced sheet and the third fiber-reinforced sheet and then, melting and pressing them at 200° C. under 300 bars.

Comparative Preparation Example

A first fiber-reinforced sheet is manufactured by pultruding first prepregs including a glass fiber and a polypropylene resin and second prepregs including a glass fiber and a polycarbonate resin, slitting them to have a 9 mm-wide tape shape, and then, plainly weaving the first prepregs to cross each other. Subsequently, three of the first fiber-reinforced sheets are stacked and then, melted and pressed at 200° C. under 300 bars to manufacture a fiber-reinforced composite material.

Experimental Example: Performance Measurement of Fiber-Reinforced Composite Material After producing a physical specimen using compression molding equipment with a clamping force of 1,100 tons, the tensile strength, flexural strength, flexural modulus, and adhesive strength are measured in the following manners, and the results are summarized in Table 1.

(1) Tensile strength is measured at a test speed of 5 mm/min according to ISO 527-4.

(2) Flexural strength and flexural modulus are measured according to ISO 14125 at 3-point bending, length between support points of 48 mm, and test speed of 1 mm/min.

(3) Adhesive strength is measured at a test speed of 5 mm/min after bonding a 100 mm long aluminum plate and a 100 mm long specimen with an adhesive of 0.2 mm thick and 12.5 mm long. In order to ensure sufficient curing of the adhesive, it is measured after adhering and maintaining at room temperature for 168 hours.

(4) In order to check flame retardancy and self-extinguishing ability, the test is conducted with a distance of 30 mm between the flame source and the specimen. After maintaining the flame for 3 min, the flame source is removed and it is confirmed whether self-extinguishing occurs. At this time, the temperature of the part where the flame and the specimen come into contact is maintained at 1,000° ° C. to 1,100° ° C.

TABLE 1

| | | Standard | | Unit | Measurement value | Note |
|---|---|---|---|---|---|---|
| Preparation Example | tensile strength | ISO | 527-4 | Mpa | 233 | — |
| | flexural strength | ISO | 14125 | Mpa | 328 | — |
| | flexural modulus | ISO | 14125 | Mpa | 12,100 | — |
| | adhesive strength | ISO | 4587 | Mpa | 9.63 | Conventional SMC: 6.68 |
| Comparative Preparation Example | adhesive strength | ISO | 4587 | Mpa | 1.55 | — |

Referring to Table 1, the fiber-reinforced composite according to one aspect of the example has excellent mechanical properties, flame resistance, and adhesion, and has resistance to externally generated flame on the outside and excellent adhesion to aluminum on the inside.

In particular, the fiber-reinforced composite material according to an embodiment exhibits excellent adhesive strength, compared with that of the comparative preparation example as well as conventional SMC, and thus confirms excellent adhesion with an aluminum cooling plate located at the bottom of a battery of an electric vehicle.

Figure 3:
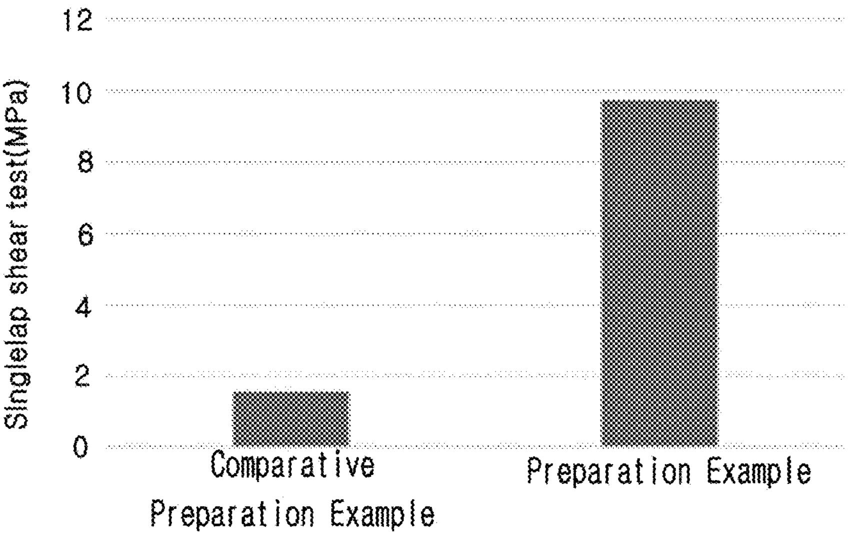
FIG. 3 is a graph showing adhesive strength of fiber-reinforced composites according to Preparation Example and Comparative Preparation Example.

In addition, a singlelap shear test is performed by using MTS 100 kN frame equipment, and the results are shown in FIG. 3. The singlelap shear test is performed at 5 mm/min after adhering a 100 mm-long aluminum plate and a 100 mm-long specimen with a 0.2 mm-thick and 12.5 mm-long epoxy-based adhesive. In order to sufficiently curing the adhesive, the measurement is performed after maintaining it at room temperature for 168 hours.

FIG. 3 is a graph showing adhesive strength of fiber-reinforced composites according to Preparation Example and Comparative Preparation Example.

Referring to FIG. 3, the fiber-reinforced composite material according to an embodiment has higher adhesive strength than that of the comparative preparation example and thus exhibits excellent mechanical properties.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: fiber-reinforced composite material
11: first prepreg
12: second prepreg
110: first fiber-reinforced sheet
120: second fiber-reinforced sheet
130: third fiber-reinforced sheet

What is claimed is:

1. A fiber-reinforced composite material, comprising a first fiber-reinforced sheet in which first prepregs including reinforcing fibers arranged in one direction and a first thermoplastic resin are woven to cross each other, a second fiber-reinforced sheet in which the first prepreg, and a second prepreg including reinforcing fibers arranged in one direction and a second thermoplastic resin are woven to cross each other, and a third fiber-reinforced sheet in which the second prepregs are woven to cross each other, wherein the second fiber-reinforced sheet is disposed between the first fiber-reinforced sheet and the third fiber-reinforced sheet, and the first thermoplastic resin of the first prepreg and the second thermoplastic resin of the second prepreg are different thermoplastic resins.

2. The fiber-reinforced composite material of claim 1, wherein the first prepreg and the second prepreg are in tape form that is thin, has a width longer than the thickness, and has a length longer than the width.

3. The fiber-reinforced composite material of claim 2, wherein the reinforcing fibers of the first prepreg are arranged in a longitudinal direction of the first prepreg, and the reinforcing fibers of the second prepreg are arranged in a longitudinal direction of the second prepreg.

4. The fiber-reinforced composite material of claim 1, wherein the first fiber-reinforced sheet, the second fiber-reinforced sheet, and the third fiber-reinforced sheet are each woven in a plain weave.

5. The fiber-reinforced composite material of claim 4, wherein in the second fiber-reinforced sheet, an angle formed by the first prepreg and the second prepreg is vertical.

6. The fiber-reinforced composite material of claim 1, wherein the second fiber-reinforced sheet includes the first prepreg and the second prepreg at a weight ratio of 1:1 to 0.9:2.

7. The fiber-reinforced composite material of claim 1, wherein the first thermoplastic resin of the first prepreg includes a polypropylene resin.

8. The fiber-reinforced composite material of claim 1, wherein the second thermoplastic resin of the second prepreg includes a polycarbonate resin.

9. The fiber-reinforced composite material of claim 1, wherein the reinforcing fibers are continuous reinforcing fibers.

10. The fiber-reinforced composite material of claim 1, wherein the reinforcing fibers include glass fibers, carbon fibers, basalt fibers, metallic fibers, aramid fibers, polypropylene fibers, polyethylene terephthalate fibers, polybutylene terephthalate fibers, polyethylene fibers, natural fibers, or a combination thereof.

11. The fiber-reinforced composite material of claim 1, wherein the first fiber-reinforced sheet, the second fiber-reinforced sheet, and the third fiber-reinforced sheet are bonded by melting and pressing the first thermoplastic resin and the second thermoplastic resin.

12. The fiber-reinforced composite material of claim 11, wherein the fiber-reinforced composite does not include an adhesive between the first fiber-reinforced sheet and the second fiber-reinforced sheet, or between the second fiber-reinforced sheet and the third fiber-reinforced sheet.

13. A method of manufacturing a fiber-reinforced composite material, comprising manufacturing first prepregs including reinforcing fibers arranged in one direction and a first thermoplastic resin, manufacturing second prepregs including reinforcing fibers arranged in one direction and a second thermoplastic resin, weaving the first prepregs to cross each other to manufacture a first fiber-reinforced sheet, weaving the first prepreg and the second prepreg to cross each other to manufacture a second fiber-reinforced sheet, weaving the second prepregs to cross each other to manufacture a third fiber-reinforced sheet, and laminating the second fiber-reinforced sheet between the first fiber-reinforced sheet and the third fiber-reinforced sheet, wherein the first thermoplastic resin of the first prepreg and the second thermoplastic resin of the second prepreg are different thermoplastic resins.

14. The method of claim 13, wherein a prepreg sheet including reinforcing fibers arranged in one direction and a thermoplastic resin is manufactured using a pultrusion method, and the prepreg sheet is subjected to slitting along an arrangement direction of the reinforcing fibers, to manufacture the first prepreg and the second prepreg having a tape form.

15. The method of claim 13, wherein the weave is in a plain weave.

16. The method of claim 13, wherein the second fiber-reinforced sheet is laminated between the first fiber-reinforced sheet and the third fiber-reinforced sheet followed by melting and pressing.

* * * * *